(12) United States Patent
Zagoroff

(10) Patent No.: US 7,971,460 B2
(45) Date of Patent: Jul. 5, 2011

(54) METHOD AND MECHANISM FOR ATTACHING A LOCKING MECHANISM TO A PICK-UP TRUCK TAILGATE

(76) Inventor: Dimiter S. Zagoroff, Lincoln, MA (US)

( * ) Notice: Subject to any disclaimer, the term of this patent is extended or adjusted under 35 U.S.C. 154(b) by 816 days.

(21) Appl. No.: 11/978,994

(22) Filed: Oct. 30, 2007

(65) Prior Publication Data

US 2008/0127690 A1 Jun. 5, 2008

Related U.S. Application Data

(60) Provisional application No. 60/855,300, filed on Oct. 30, 2006.

(51) Int. Cl.
*B60R 25/02* (2006.01)

(52) U.S. Cl. ............... 70/208; 292/336.3; 292/DIG. 29; 292/DIG. 31; 292/DIG. 42; 292/DIG. 43

(58) Field of Classification Search .................... 70/208, 70/209; 292/336.3, DIG. 29, DIG. 31, DIG. 42, 292/DIG. 43
See application file for complete search history.

(56) References Cited

U.S. PATENT DOCUMENTS

| | | | | |
|---|---|---|---|---|
| 5,288,116 A * | 2/1994 | Donofrio | .................... | 292/336.3 |
| 5,320,151 A * | 6/1994 | Wumer | ........................ | 144/348 |
| 5,941,104 A * | 8/1999 | Sadler | .............................. | 70/208 |
| 5,969,431 A * | 10/1999 | Miller et al. | ................. | 307/10.1 |
| 5,987,943 A * | 11/1999 | Verga et al. | ..................... | 70/208 |
| 6,059,329 A * | 5/2000 | Spitzley | ...................... | 292/336.3 |
| 6,209,366 B1 * | 4/2001 | Zagoroff | ......................... | 70/208 |
| 6,314,631 B1 * | 11/2001 | Pryor | ......................... | 29/407.04 |
| 6,427,502 B1 * | 8/2002 | Zagoroff | ......................... | 70/208 |
| 6,513,353 B1 * | 2/2003 | Weinerman et al. | ............ | 70/208 |
| 6,523,869 B1 * | 2/2003 | Jensen et al. | ............... | 292/336.3 |
| 6,651,467 B1 * | 11/2003 | Weinerman et al. | ............ | 70/208 |
| 6,832,801 B2 | 12/2004 | Zagoroff | | |
| 6,857,679 B2 | 2/2005 | Zagaroff | | |
| 6,938,941 B2 * | 9/2005 | Thiele et al. | .................... | 296/50 |
| 6,994,390 B2 | 2/2006 | Zagoroff | | |
| 7,237,411 B2 * | 7/2007 | Pantke et al. | ................... | 70/208 |
| 7,240,946 B2 | 7/2007 | Zagoroff | | |
| 7,497,488 B2 * | 3/2009 | Chen | ............................. | 292/216 |
| 7,779,659 B2 * | 8/2010 | Tanimoto et al. | ............... | 70/210 |
| 7,819,444 B2 * | 10/2010 | Kagawa et al. | ............ | 292/336.3 |
| 2004/0144142 A1 * | 7/2004 | Dimig et al. | .................... | 70/208 |
| 2007/0131003 A1 * | 6/2007 | Williamson et al. | ............ | 70/208 |
| 2007/0247800 A1 * | 10/2007 | Smith et al. | .................... | 361/683 |
| 2008/0127690 A1 | 6/2008 | Zagoroff | | |
| 2008/0277960 A1 | 11/2008 | Zagoroff | | |
| 2010/0037529 A1 * | 2/2010 | Botten et al. | ................. | 49/483.1 |

* cited by examiner

*Primary Examiner* — Suzanne D Barrett

(74) *Attorney, Agent, or Firm* — Hamilton, Brook, Smith & Reynolds, PC

(57) ABSTRACT

A method of mounting a lock to a pick-up truck tailgate latching mechanism including the steps of locating targets for holes to be formed in a plastic bezel, the bezel carrying a handle for the tailgate, forming the holes in the plastic bezel, and securing the locking mechanism to the bezel via the formed holes.

14 Claims, 17 Drawing Sheets

METHOD AND MECHANISM FOR ATTACHING A LOCKING MECHANISM TO A PICK-UP TRUCK TAILGATE

RELATED APPLICATION(S)

This application claims the benefit of U.S. Provisional Application No. 60/855,300, filed on Oct. 30, 2006.

The entire teachings of the above application are incorporated herein by reference.

BACKGROUND OF THE INVENTION

A pickup truck typically has a cargo space secured by a tailgate. Pulling up on the tailgate handle releases a latching mechanism so that the tailgate may be swung down around its hinges to a horizontal position to provide access to the cargo area for loading and unloading. Generally, the hinges are constructed to permit lifting the tailgate off its hinges when it is in the horizontal position and removing it from the truck.

The need to lock the tailgate is twofold. First, particularly when a camper top or a tonneau cover is mounted on the truck, it is desirable to be able to lock the tailgate to protect the gear stowed inside. Secondly, the tailgate itself is a desirable object for theft.

A tailgate is generally constructed as a box section with the inner panel and the outer panel spaced apart by several inches. The handle and the latching mechanism are mounted between the two panels. To install the latching mechanism, truck manufacturers have taken two different approaches. One approach is to insert the mechanism from the inside, by providing a removable access door on the inside panel. The other, less expensive approach is to insert the mechanism from the outside through a handle aperture in the outside panel. In that instance, the handle aperture must be made big enough to accommodate the latching mechanism. To improve the appearance of the tailgate exterior, a snap-in plastic bezel may be mounted to the tailgate outer panel filling the void between the handle and the edges of an aperture. Some bezels have an aperture roughly equivalent in size to the handle of the tailgate latching mechanism such that if the tailgate were disassembled, the handle could be passed through the aperture. The aperture, in this configuration, is generally hidden from casual view by the handle when the tailgate is properly assembled. In an alternative configuration, the bezel may only have small apertures that accommodate a portion of the handle, such as arms that attach the handle to actuating mechanisms for the tailgate on the interior of the tailgate.

One anti-theft device comprises a replacement bezel supporting a lock with a locking arm that prevents actuation of the tailgate handle and with a locking bolt that prevents removal of the bezel when the device is in the locked position. While this device affords a convenient and secure anti-theft solution, it is relatively expensive to manufacture. The replacement bezel has an intricate shape with retaining clips that has to be molded by precision injection molding tools. A truck manufacturer can amortize the cost of these tools over the entire number of trucks that are manufactured. However, an after-market manufacturer of the replacement bezel has to amortize the same tooling cost over a much smaller number of units sold, which adds significantly to the cost of those units. In addition, the cost of the prior anti-theft device is raised further by the need for both a locking arm and a locking bolt.

SUMMARY OF THE INVENTION

The present invention comprises a locking mechanism mounted to the plastic bezel of a tailgate that requires only minor modification to the bezel when the bezel does not provide ready access to the interior components of the tailgate.

In one embodiment of the invention comprises a method of mounting a lock to a tailgate comprising the steps of locating targets for holes to be drilled in the plastic bezel surrounding a tailgate handle, forming one or more holes at the targets, and securing a locking mechanism at an exterior portion of the bezel via the one or more holes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In U.S. Pat. No. 6,427,502 ("the '502 patent"), I disclosed a locking mechanism that includes a mounting bracket that passes through a large aperture in a bezel of a tailgate. The locking mechanism disclosed in that patent is generally seated immediately beneath the tailgate handle in a recess. The locking mechanism includes a cam that moves between a first position and a second position. In the first position, the cam interferes with the path of movement of the tailgate handle, preventing the handle from being pulled, effectively locking the tailgate. In the second position, the cam does not interfere with the path of movement of the tailgate handle, allowing the handle to be pulled.

The locking mechanism disclosed in the '502 Patent does not address two issues. First, some tailgate bezels do not include the large aperture that would allow bracket mounting as taught in the '502 Patent. Second, some tailgates are now constructed to allow swinging in two directions: swinging down on a horizontal axis or swinging to the side on a vertical axis. These bi-directional tailgates often have two separate handles, each handle controlling the latching mechanism for one of the two types of movement. A single locking mechanism of the type disclosed in the '502 Patent cannot effectively lock such a tailgate.

The locking mechanism disclosed herein may be mounted to a bezel without an adequately sized aperture for a bracket. Furthermore, this locking mechanism may be mounted to the bezel to allow the locking mechanism to create a moveable interference with a portion of the tailgate latching mechanism utilized in all directions of movement of the tailgate.

Figure 1A:
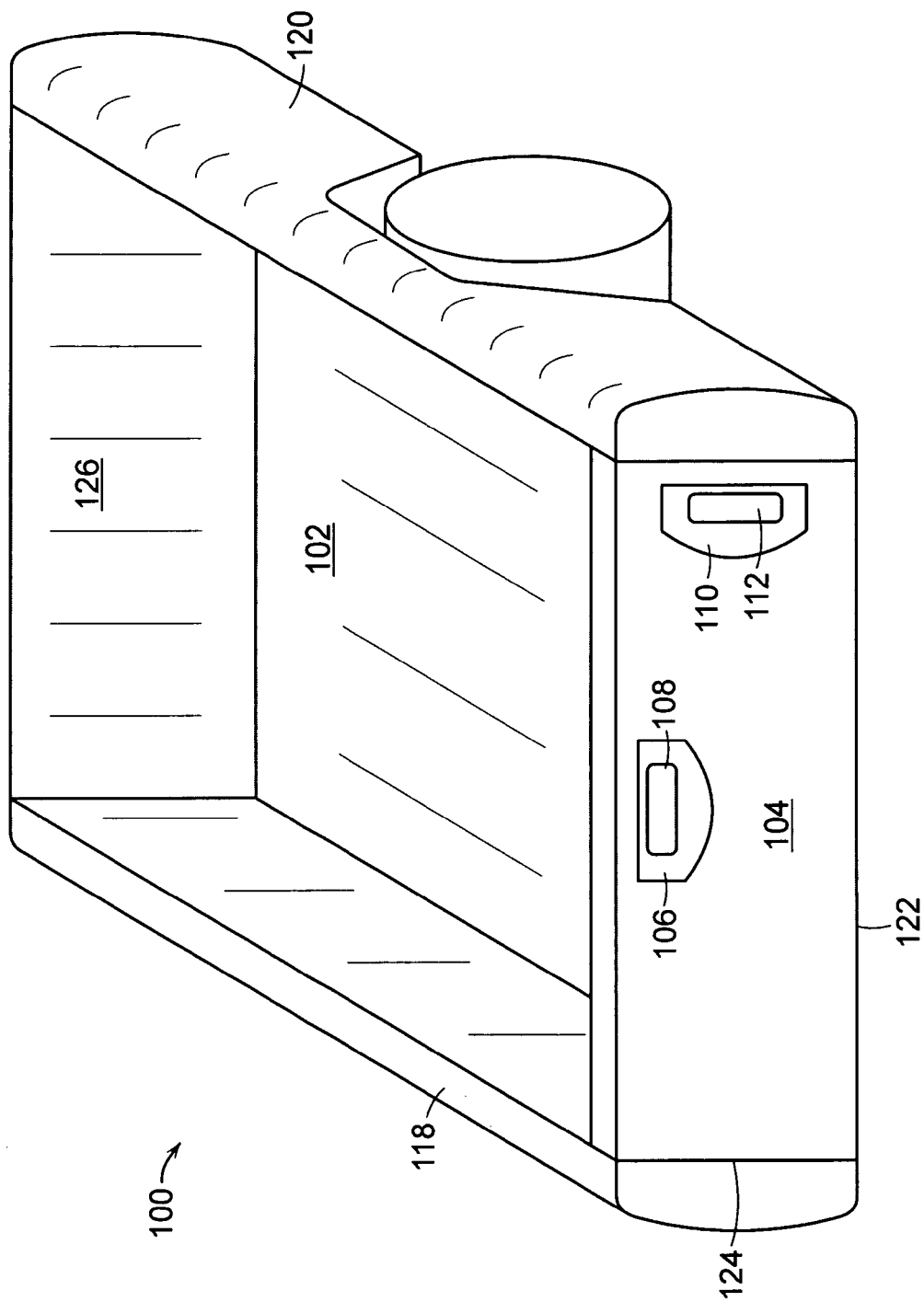
FIG. 1A shows a typical pick-up truck bed and a tailgate with two latches.
Figure 1B:
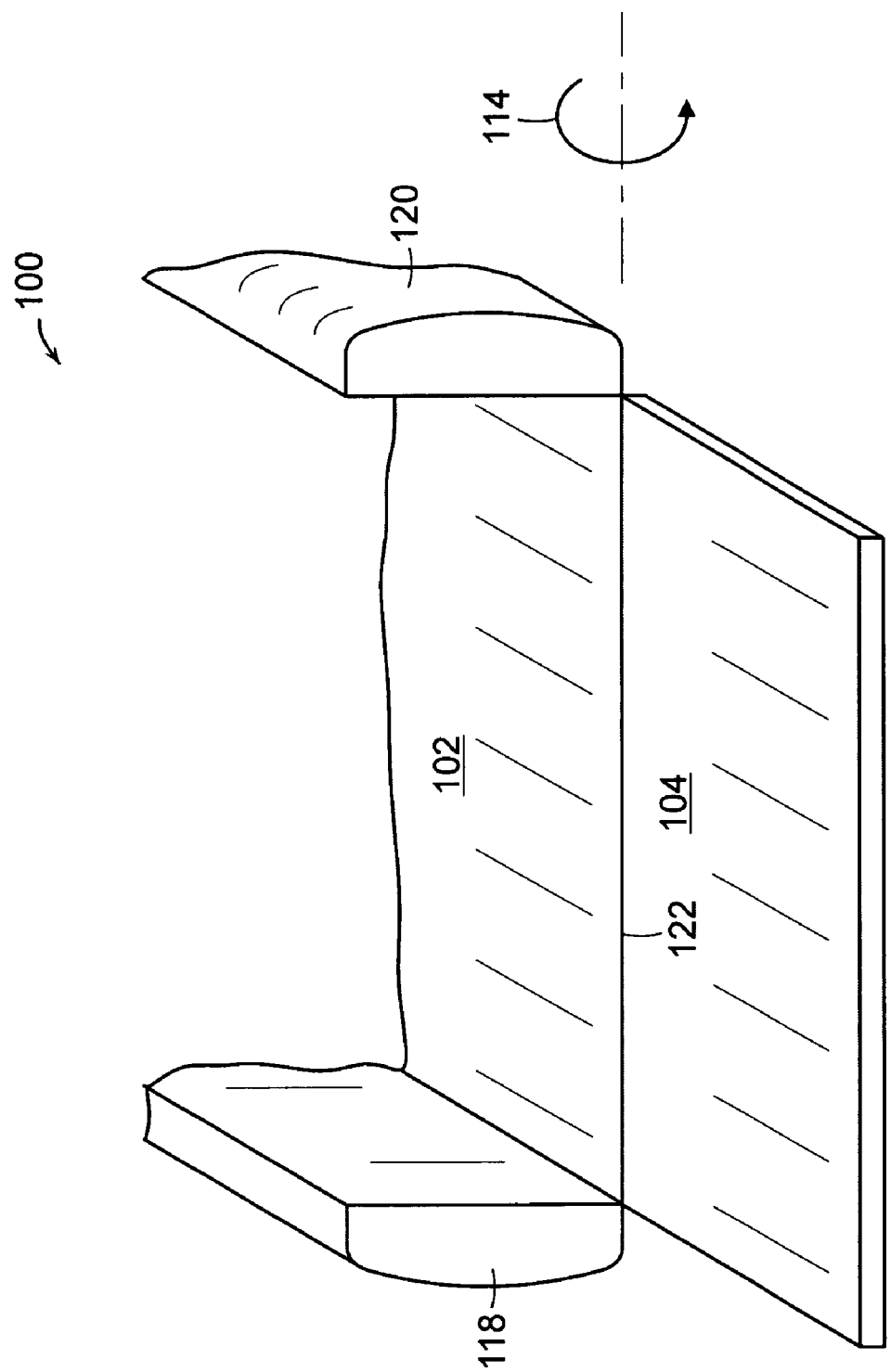
FIG. 1B shows the tailgate of FIG. 1A with the tailgate swung down to an open position.
Figure 1C:
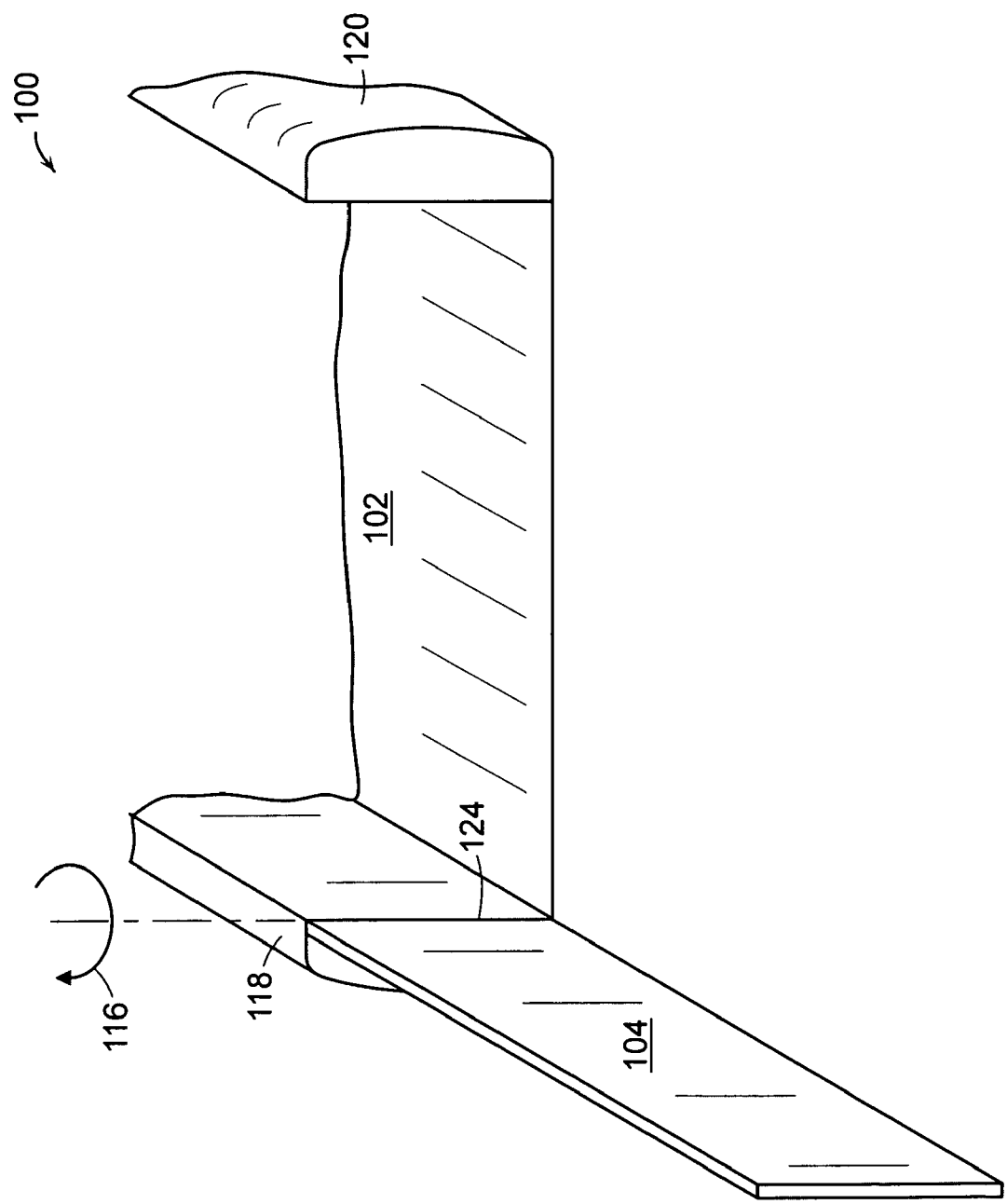
FIG. 1C shows the tailgate of FIG. 1A with the tailgate swung to the side in an open position.

FIG. 1A shows a typically configured pick-up truck bed 100 with a cargo area 102. The cargo area 102 is boxed in by a front wall 126, two side walls 118, 120, and a tailgate 104. FIG. 1A shows two bezels 106, 110, each bezel carrying a handle 108, 112 mounted to tailgate 104. FIG. 1B shows a typical mounting and movement of a tailgate 104, in which the tailgate is rotated in the direction of arrow 114 by hinge 122. Handle 108, when pulled, releases latches (not shown), freeing the tailgate to swing around hinge 122 in the direction of arrow 114. FIG. 1C shows a second mounting and movement of a tailgate 104, in which the tailgate is rotated in the direction of arrow 116 by hinge 124. Handle 112, when pulled, releases latches (not shown), freeing the tailgate to swing around hinge 124 in the direction of arrow 116. A pick-up truck may be equipped with one or both of the latch/hinge configurations shown above. The exact placement of the handles 108, 112 are not important.

Figure 2A:
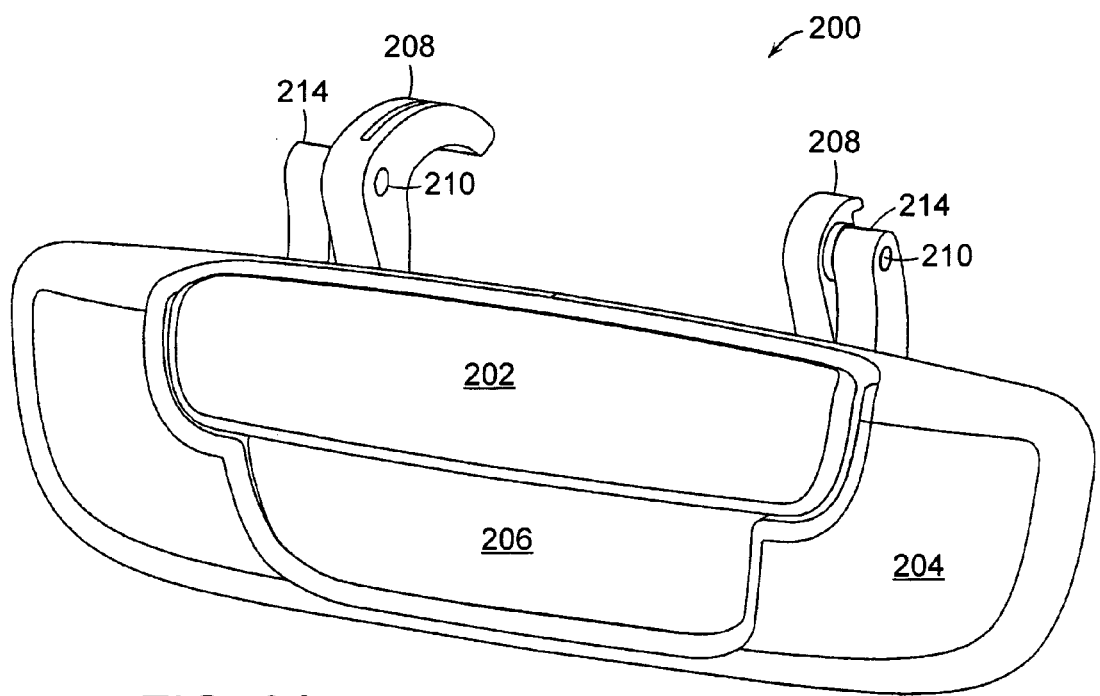
FIG. 2A shows a detail view of the exterior portion of a handle assembly.

FIG. 2A shows an exemplary handle assembly 200 that would be mounted in the tailgate 104 of a pick-up truck. The handle assembly 200, as shown in FIG. 2A includes an exterior portion of a bezel 204, typically made of plastic, surrounding a handle 202. The handle 202 is pivotally mounted to arm portions 214 of the handle assembly 200 with pins 210. The handle 202 also has arms 208 that interact with the latching mechanism (not shown) inside the tailgate 104. The exterior portion of the plastic bezel 204 includes a recess 206 providing access to grip the handle 202.

Figure 2B:
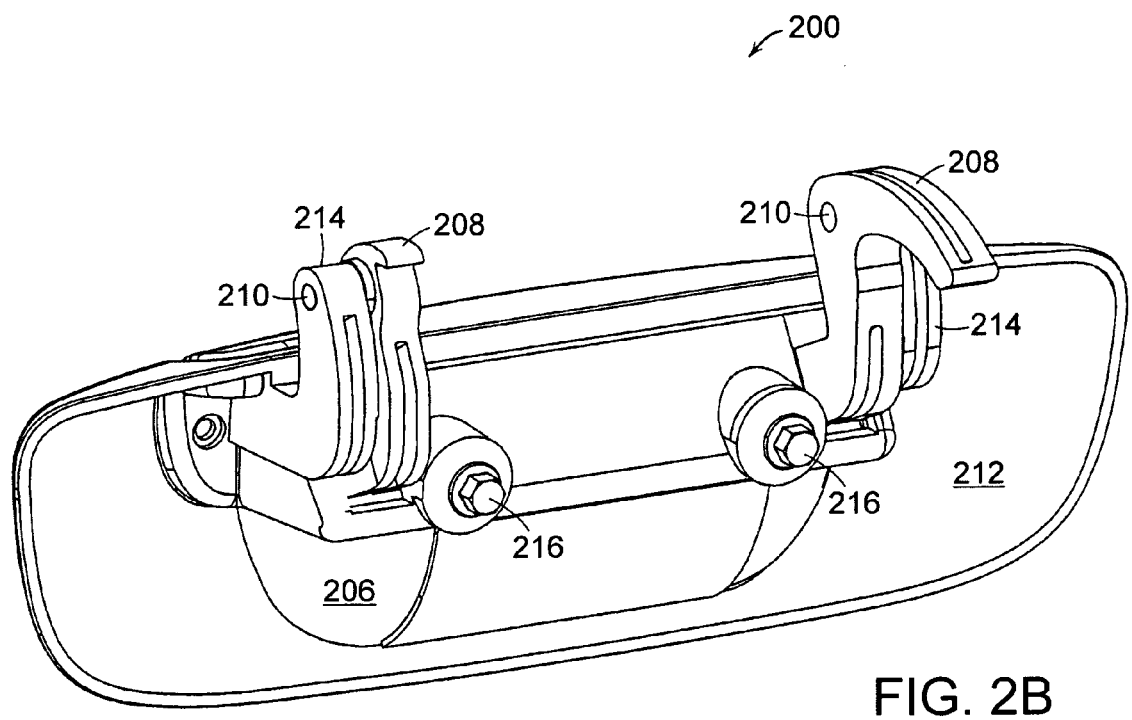
FIG. 2B shows a detail view of the interior portion of a handle assembly.

FIG. 2B shows an opposite view of the exemplary handle assembly 200 of FIG. 2A. The view in FIG. 2B shows an interior portion of the bezel 212 and clearly shows the arm portions 214 of the handle assembly 200. FIG. 2B also shows bolts 216 screwed into bolt receptacles (not visible) located on the interior portion of the bezel 212. The bolt receptacles are typically molded in the handle assembly 200. When the handle assembly 200 is installed in a tailgate 104, bolts 216 would also pass through an interior mounting (not shown) in the tailgate 104 to rigidly attach the handle assembly 200 to the tailgate 104.

Figure 3A:
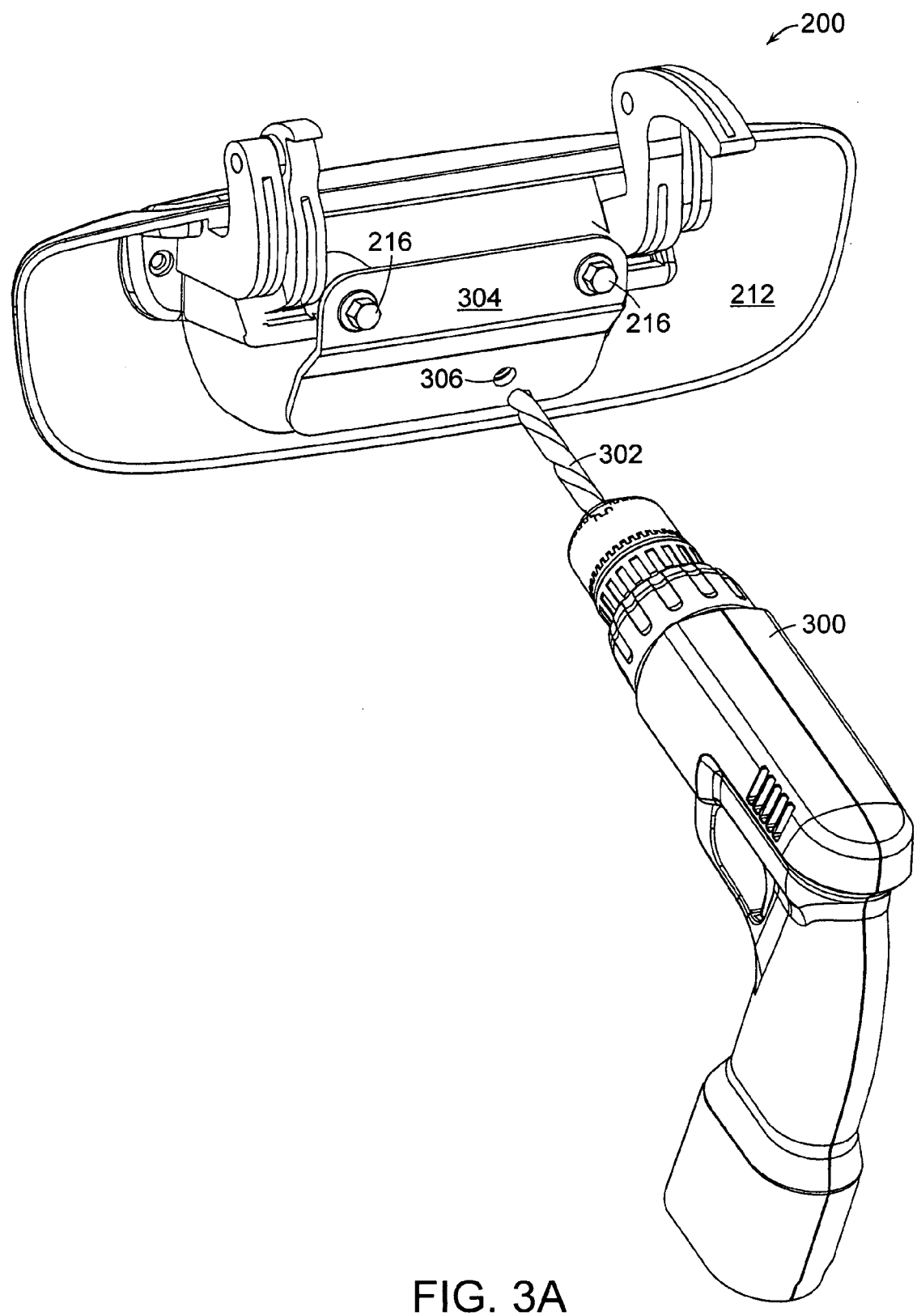
FIG. 3A shows a method of using a template to locate a hole to be drilled in a first embodiment of a handle assembly.

FIGS. 3A-3D show one method of attaching a locking mechanism 312 (shown in FIGS. 3B-3D) to a handle assembly 200. FIG. 3A shows the interior portion of bezel 212. Template 304 is attached to handle assembly 200 by bolts 216. Template 304 is attached by temporarily removing bolts 216 so template 304 can be moved into place such that holes (not visible) in template 304 align with holes (not visible) located on the interior portion of the bezel 212. Bolts 216 are then replaced, rigidly holding template 304 in place relative to the interior portion of the bezel 212. Template 304 also could be rigidly held by pins, dowels, rivets, or screws instead of using bolts 216. Note that when bolts 216 are removed from handle assembly 200, the handle assembly 200 may be easily removed from tailgate 104, which may make the method disclosed herein easier to perform. After template 304 is installed on the interior portion of the bezel 212, a drill 300 and drill bit 302 are used to drill a hole (not visible) in the handle assembly 200 from the interior portion of the bezel 212 to the exterior portion of the bezel 204. The drill bit 302 is positioned and guided during the drilling process by hole 306 located in template 304.

Figure 3B:
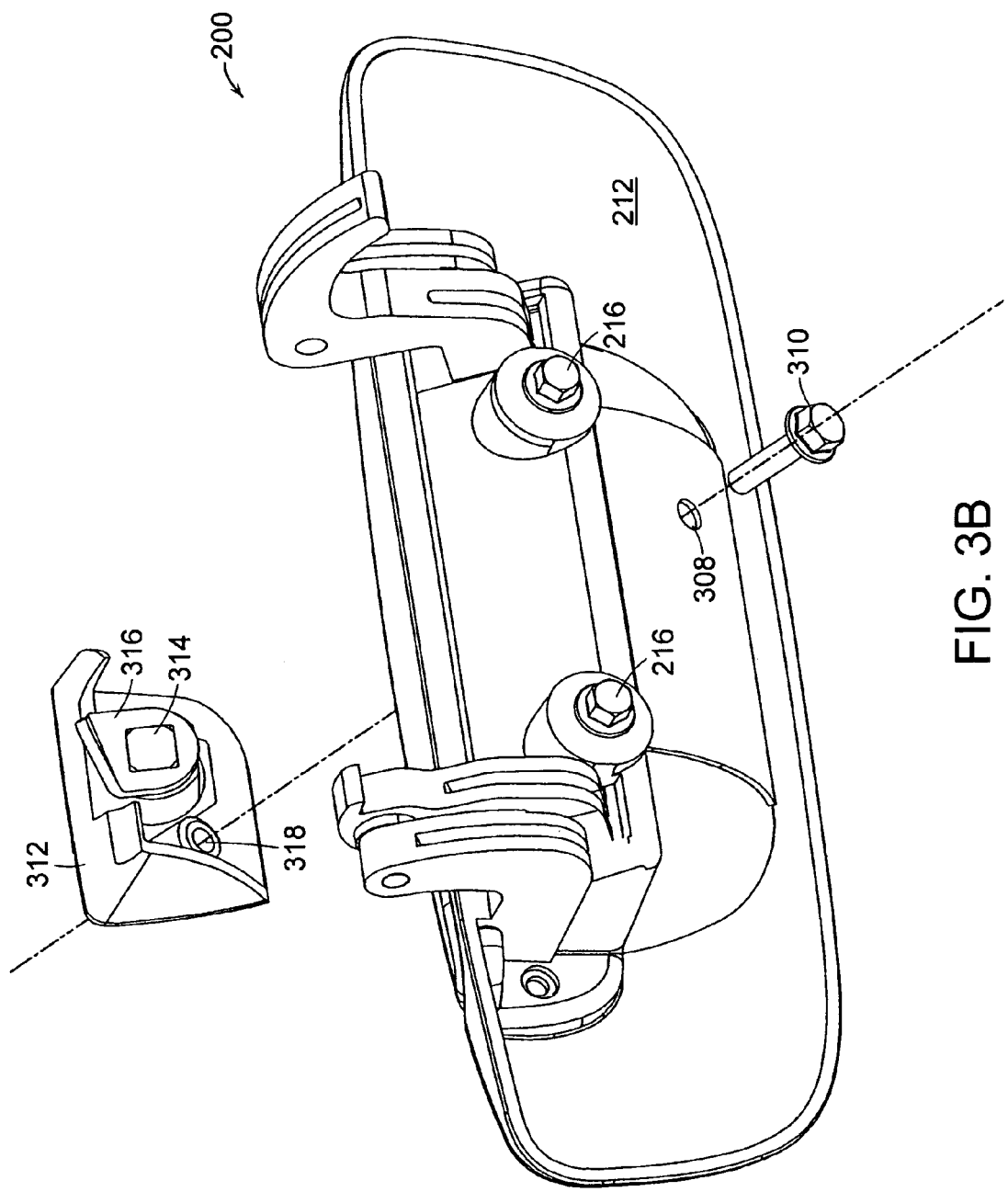
FIG. 3B shows an exploded view of the handle assembly of FIG. 3A and a locking mechanism.

As illustrated in FIG. 3B, after hole 308 is drilled in the handle assembly 200, lock assembly 312 is mounted to the exterior portion of the bezel 204, in recess 206 in this example. The lock assembly 312 is held in place by bolt 310, which passes through hole 308 to interface with bolt receptacle 318. Alternatively, the lock assembly 312 can be held in place by a rivet passing through hole 308 or by a threaded portion of the locking mechanism (not shown) that passes through hole 308 and tightening a nut onto the threads extending to the interior portion of the plastic bezel. Note that FIG. 3B shows template 304 being removed prior to the installation of lock assembly 312 and bolt 310. Alternatively, template 304 could be left in place such that bolt 310 passes through template guide hole 306 and hole 308 in handle assembly 200.

Lock assembly 312, in addition to bolt receptacle 318, also has a lock cylinder 314 and a cam 316. The lock cylinder 314, in this example, has a square end portion, enabling the cam 316 to be properly rotationally positioned with respect to lock cylinder 314.

Figure 3C:
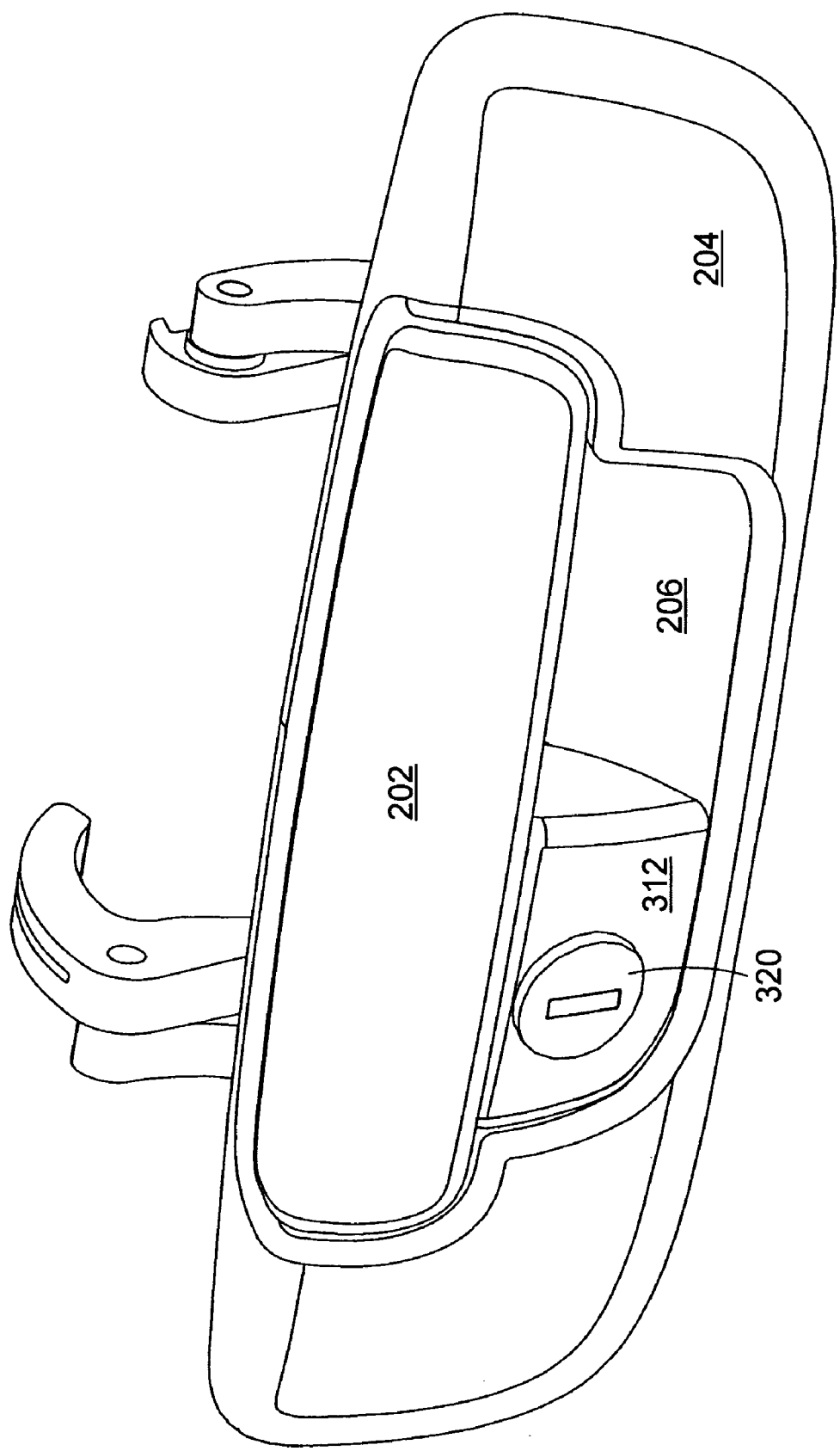
FIG. 3C shows the handle assembly and locking mechanism of FIG. 3B from an exterior perspective.

FIG. 3C shows the handle assembly 200 and a view of the exterior portion of bezel 204 with lock assembly 312 installed. Lock assembly 312, in this embodiment, is nestled within recess 206. A key interface 320 is present on an exterior surface of lock assembly 312 for a user to insert a key (not shown) and turn the lock to engage cam 316 in either a locked position or an unlocked position. Lock assembly 312, in this example, fills a portion of recess 206, but still leaves room for access to handle 202.

Figure 3D:
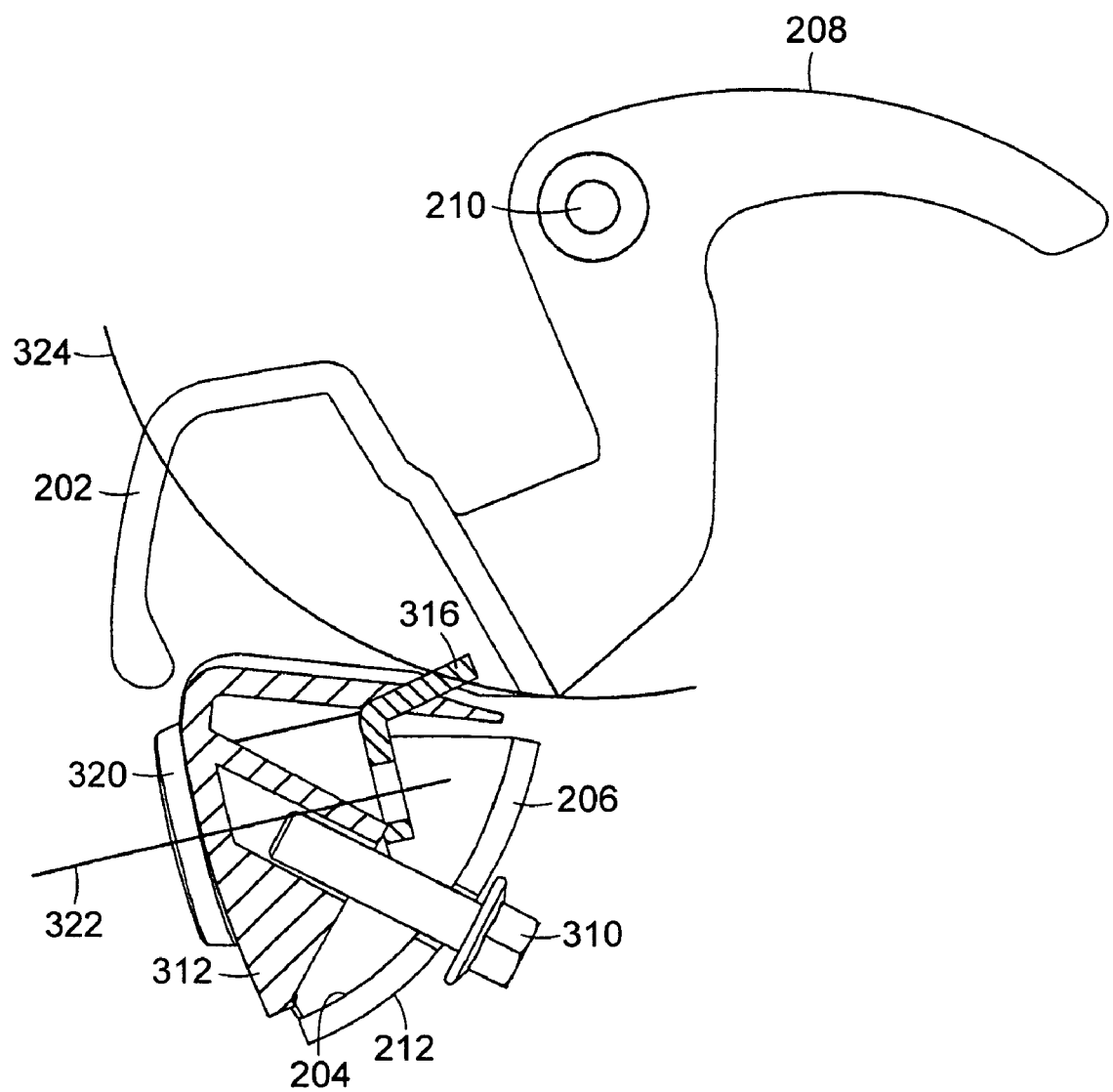
FIG. 3D shows a cross sectional view of the handle assembly and locking mechanism of FIG. 3B.

FIG. 3D shows the handle assembly 200 with installed lock assembly 312 in cross-section. For clarity, lock cylinder 314 is removed in FIG. 3D and replaced with a representation of its axis of rotation 322. Cam 316 is shown in the "locked" position, wherein a portion of cam 316 interferes with the path of movement 324 of handle 202. If someone tries to open the tailgate 104 by pulling handle 202, cam 316 will prevent handle 202 from moving far enough for arm 208 to actuate the tailgate latching mechanism (not shown).

Figure 4A:
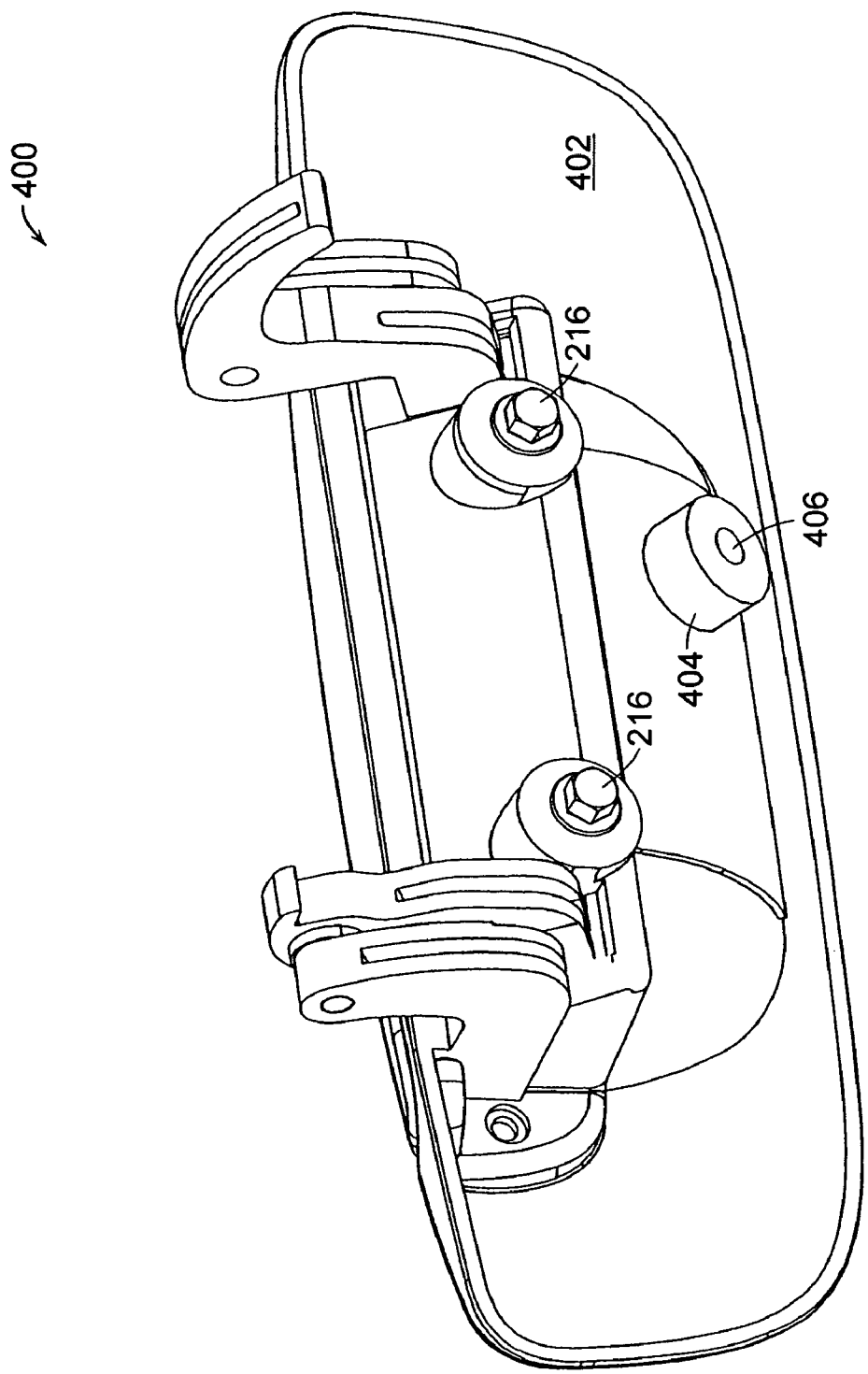
FIG. 4A shows a detail view of the interior portion of a second embodiment of a handle assembly.
Figure 4B:
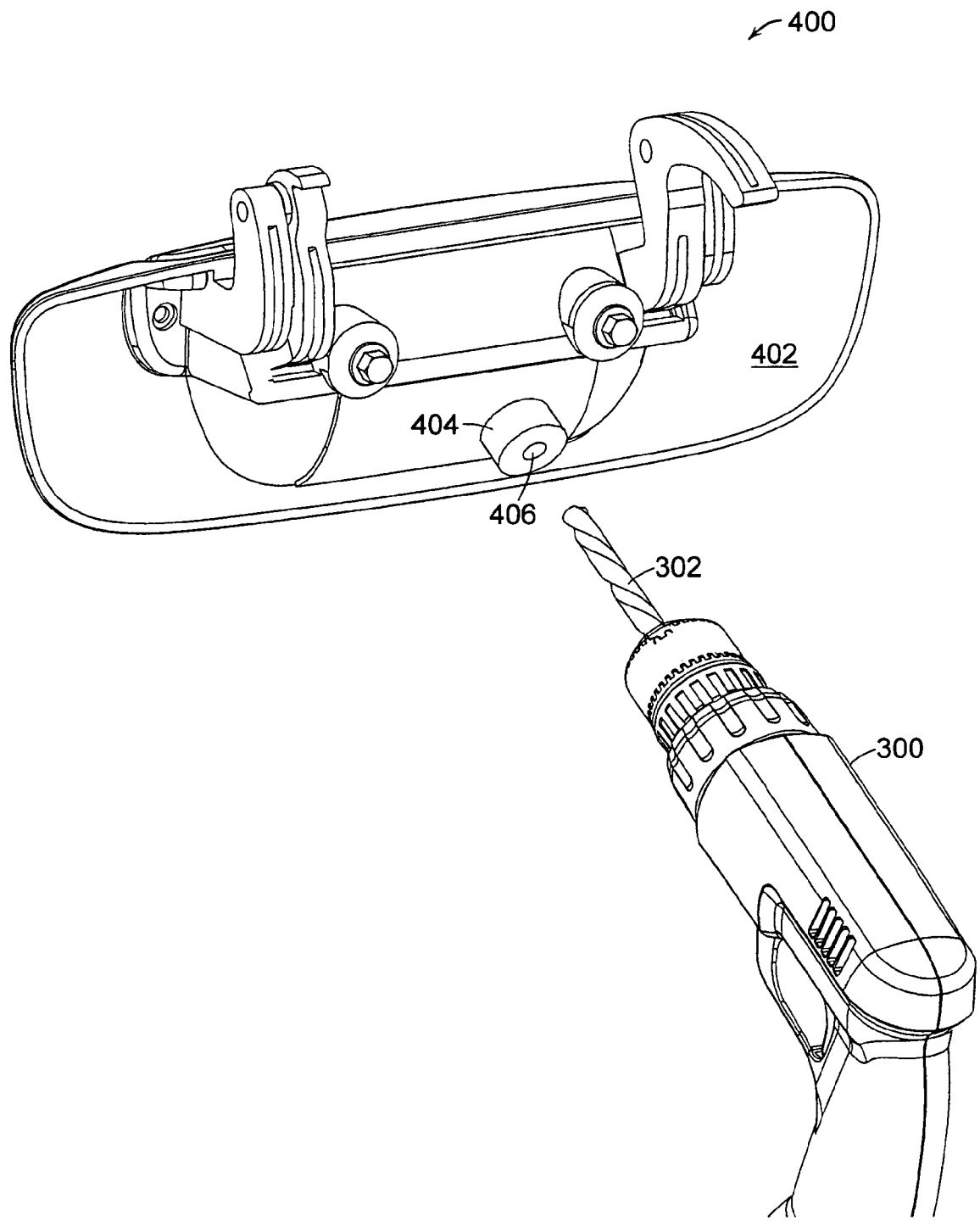
FIG. 4B shows a method of using portions of the handle assembly to locate a hole to be drilled in the handle assembly of FIG. 4A.

FIGS. 4A-4D show an alternative method of mounting a lock mechanism 312 to a handle assembly 400. FIG. 4A shows the interior portion of the bezel 402 of the handle assembly 400. The interior portion of the bezel 402 includes a raised cylindrical boss 404, which surrounds a hole 406 extending through the boss 404. The hole 406, if extended to the exterior portion of the bezel 204, would also be present in the recess area 206. However, when the bezel is molded, the hole 406, at the exterior end, is covered with plastic. When a user wishes to add a lock mechanism 312 to the handle assembly, a drill 300 and drill bit 302, as shown in FIG. 4B, are used to create hole 406. Drill bit 302 is inserted into hole 406. Hole 406 guides drill bit 302 to properly drill out the bezel material in recess 206, making the hole continuous from the interior portion of the bezel 402 to the exterior portion of the bezel 202.

Figure 4C:
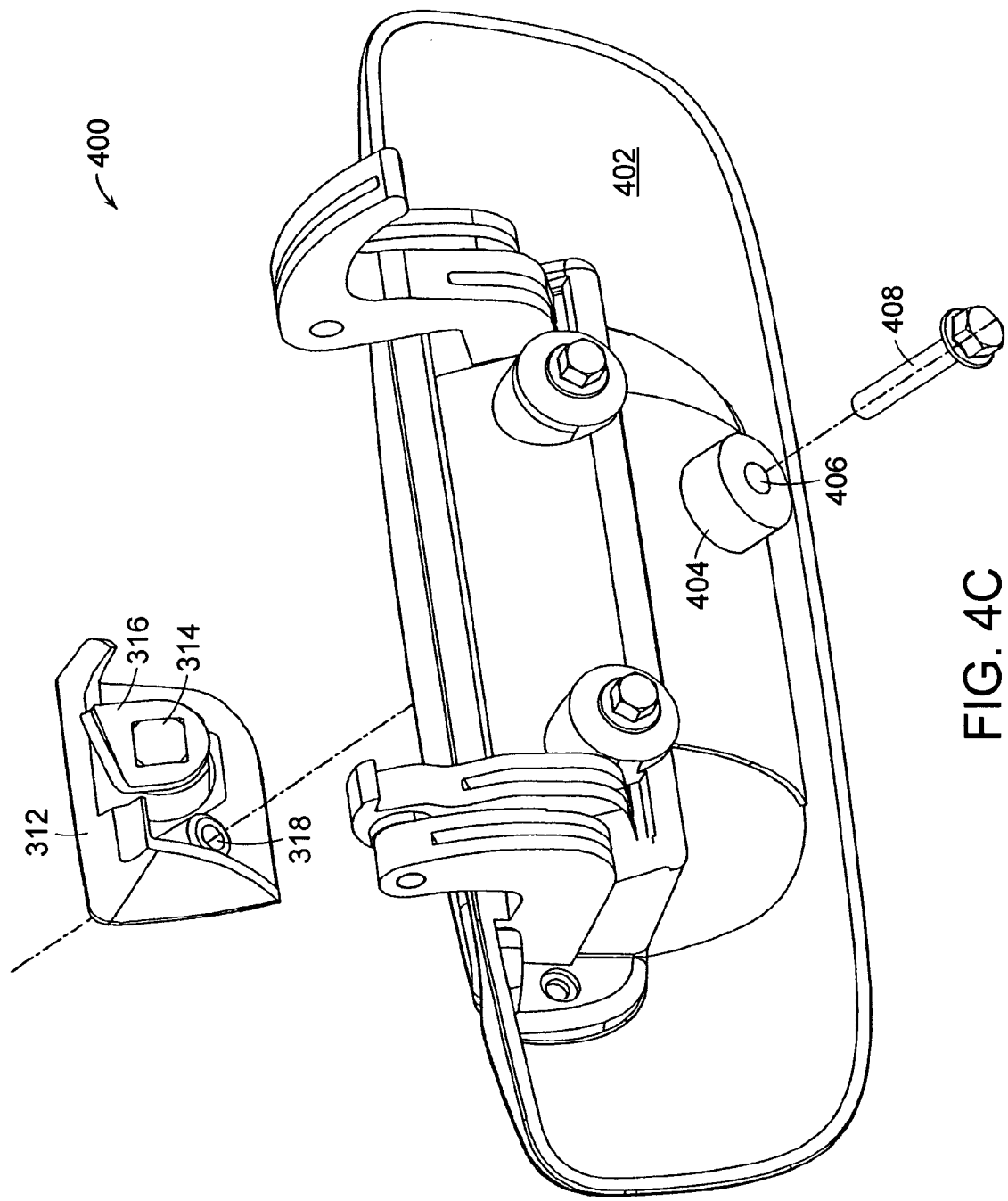
FIG. 4C shows an exploded view of the handle assembly of FIG. 4A and a locking mechanism.
Figure 4D:
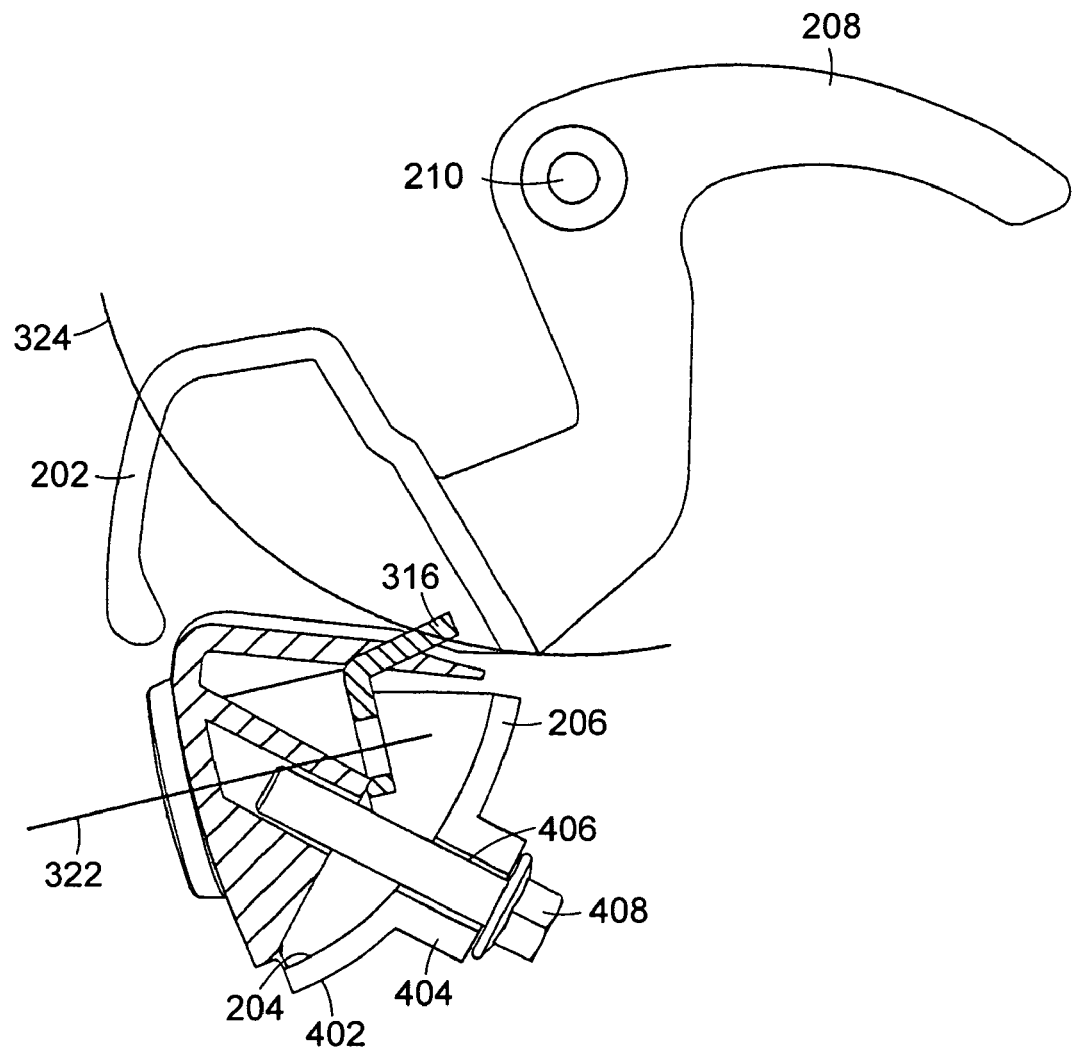
FIG. 4D shows a cross sectional view of the handle assembly and locking mechanism of FIG. 4C.

After the hole is formed, lock assembly 312 is mounted to the exterior portion of the bezel 204, in recess 206. Bolt 408 passes through hole 406 and interfaces with bolt receptacle 318 in the lock assembly as is shown in FIG. 4C. FIG. 4D shows the handle assembly 400 with installed lock assembly 312 in cross-section. For clarity, lock cylinder 314 is removed in FIG. 3D and replaced with a representation of its axis of rotation 322. Cam 316 is shown in the "locked" position, wherein a portion of cam 316 interferes with the path of movement 324 of handle 202. If someone tries to open the tailgate 104 by pulling handle 202, cam 316 will prevent handle 202 from moving far enough for arm 208 to actuate the tailgate latching mechanism (not shown).

Figure 5A:
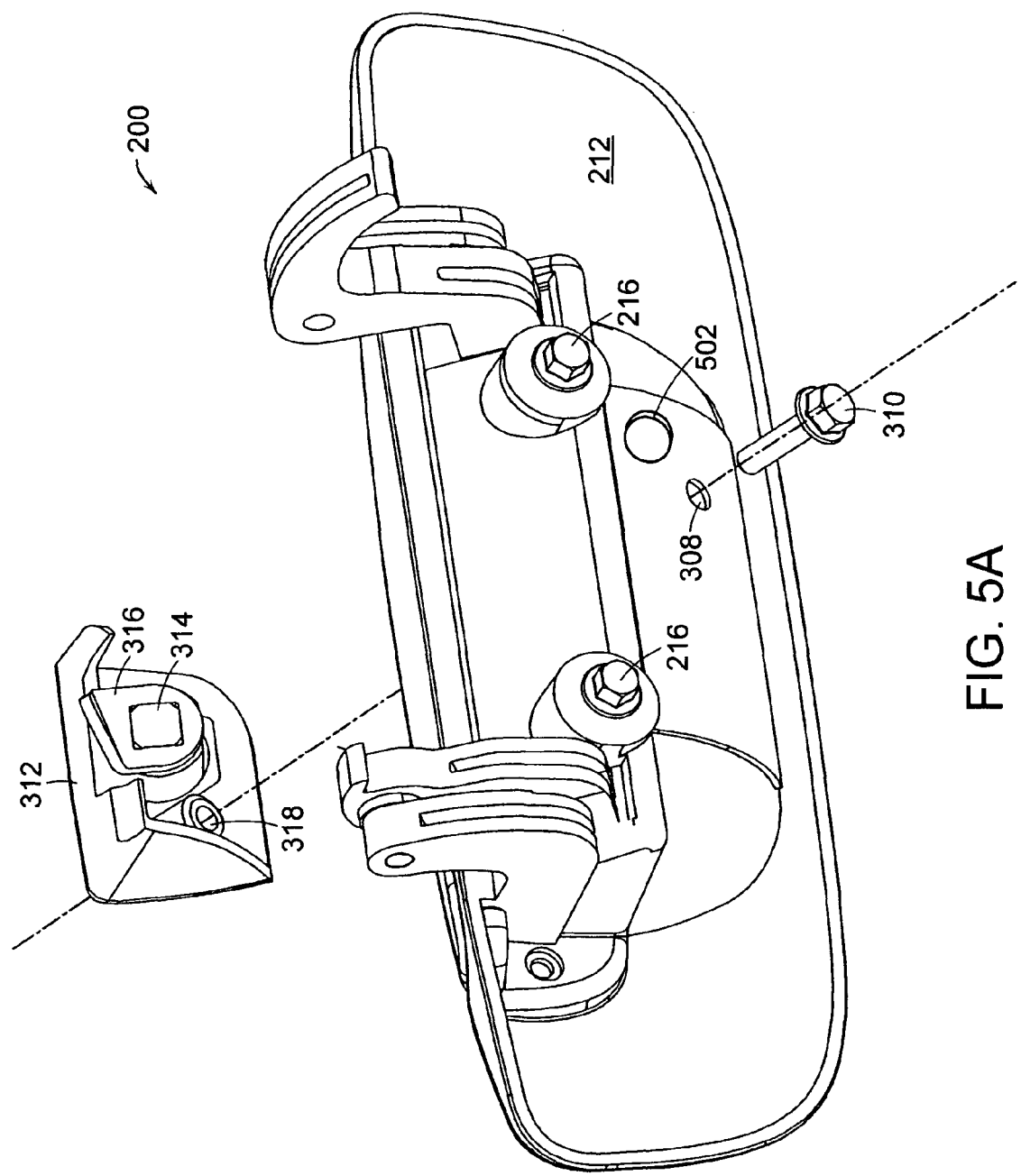
FIG. 5A shows an exploded view of a handle assembly and a locking mechanism according to a third embodiment.
Figure 5B:
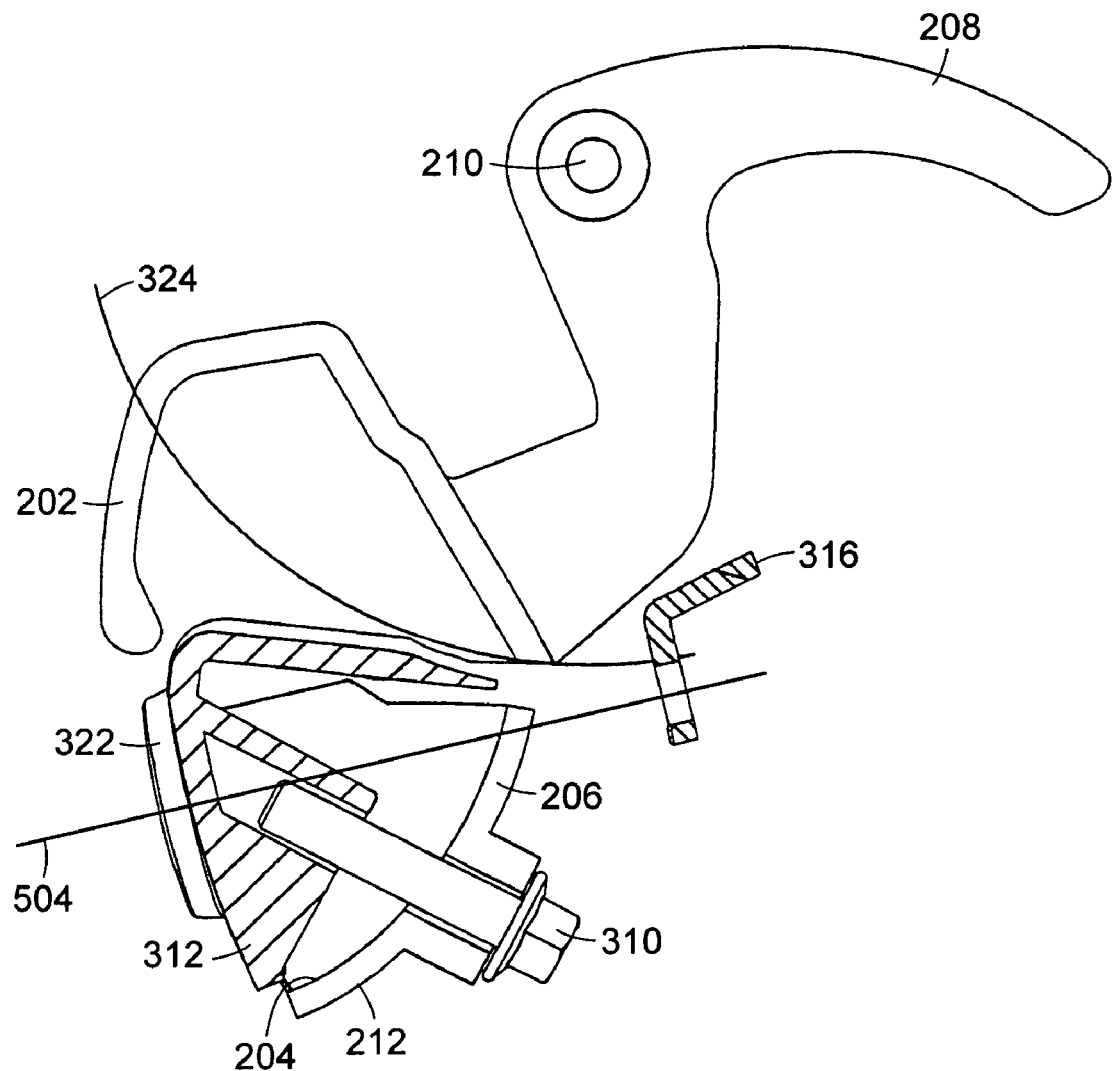
FIG. 5B shows a cross sectional view of the handle assembly and locking mechanism of FIG. 5A.

A further embodiment is shown in FIGS. 5A and 5B. FIG. 5A shows the interior portion of the bezel 212 of handle assembly 200 of FIG. 3B, except two holes 308, 502 have been drilled in the handle assembly 200. If a template is used like the template 304 used in the embodiment of FIGS. 3A-3D, then the template here (not shown) would have two holes for making holes 308 and 502. Here, as in FIG. 3B, bolt 310 passes through hole 308 and into bolt receptacle 318 of the lock mechanism 312. However, in this embodiment, lock cylinder 314 is longer and, when installed into the handle assembly 200, lock cylinder 314 extends through hole 502 such that cam 316 is located beyond the interior portion of the bezel 212. FIG. 5B shows this embodiment in cross-section. Lock cylinder 314 is not shown, but its axis of rotation 504 is shown extending through the bezel at recess 206. Cam 316 is shown beyond the interior portion of the bezel 212. In this position, cam 316 does not interfere with the path of movement 324 of handle 202. However, cam 316 may now interfere with other portions of the tailgate latching mechanism (not shown) that ultimately attach to arm 208 of handle 202. This arrangement, wherein the cam 316 interferes with internal portions of the tailgate 104 latching mechanism (not shown) may be preferable for tailgates 104 such as that illustrated in FIGS. 1A-1C, in which there are multiple handles 108, 112, each handle 108, 112 actuating a portion of the latching mechanism (not shown) to cause the tailgate 104 to either swing down, as in FIG. 1B, or swing to the side, as in FIG. 1C. A person having ordinary skill in the art would understand that cam 316 could be shaped and positioned to interfere with the movement of latching mechanism (not shown) for both handles 108, 112. A person having ordinary skill in the art would also understand that cam 316 may be installed on lock cylinder 314 after lock cylinder 314 is passed through hole 502.

Figure 6:
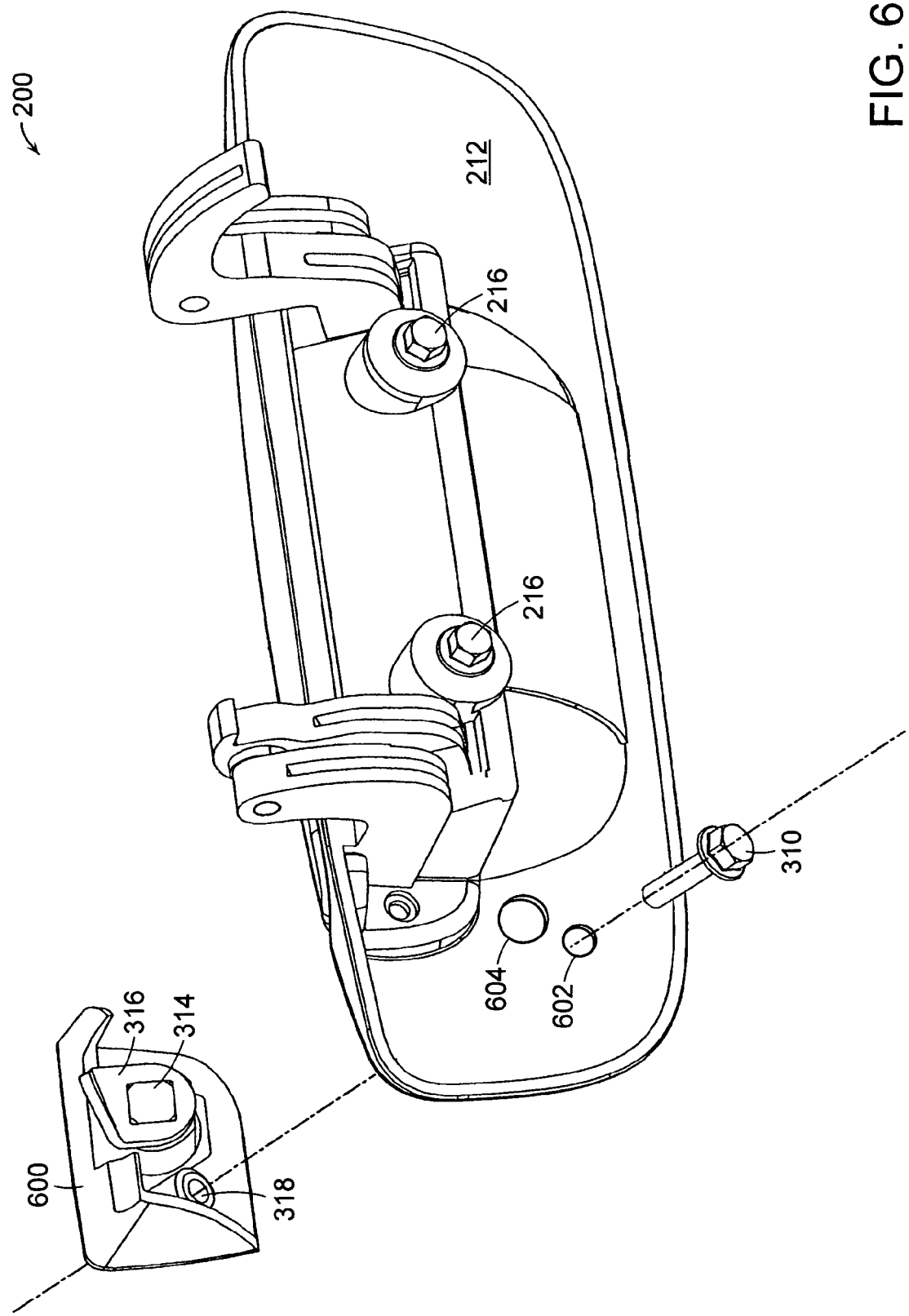
FIG. 6 shows an exploded view of a handle assembly and a locking mechanism according to a fourth embodiment.

FIG. 6 shows a further embodiment in which the lock assembly 600 is mounted on an exterior portion of the bezel 204 away from the recess 206 for the handle 202. In this case, the lock shaft 314 and cam 316 have to penetrate the handle assembly 200 to reach past the interior portion of the bezel 212 to interact with the latching mechanism (not shown). FIG. 6 shows holes 602 and 604 drilled in the handle assembly 200 to receive bolt 310 and lock shaft 314, respectively. Like the embodiments in FIGS. 5A-5B, when the lock assembly 600 is installed on the handle assembly 200, the cam 316 will be positioned to interfere with portions of the tailgate latching mechanism (not shown). A person having ordinary skill in the art would understand that cam 316 could be shaped and positioned to interfere with the movement of latching mechanism (not shown) for both handles 108, 112. A person having ordinary skill in the art would also understand that cam 316 may be installed on lock cylinder 314 after lock cylinder 314 is passed through hole 604.

Figure 7:
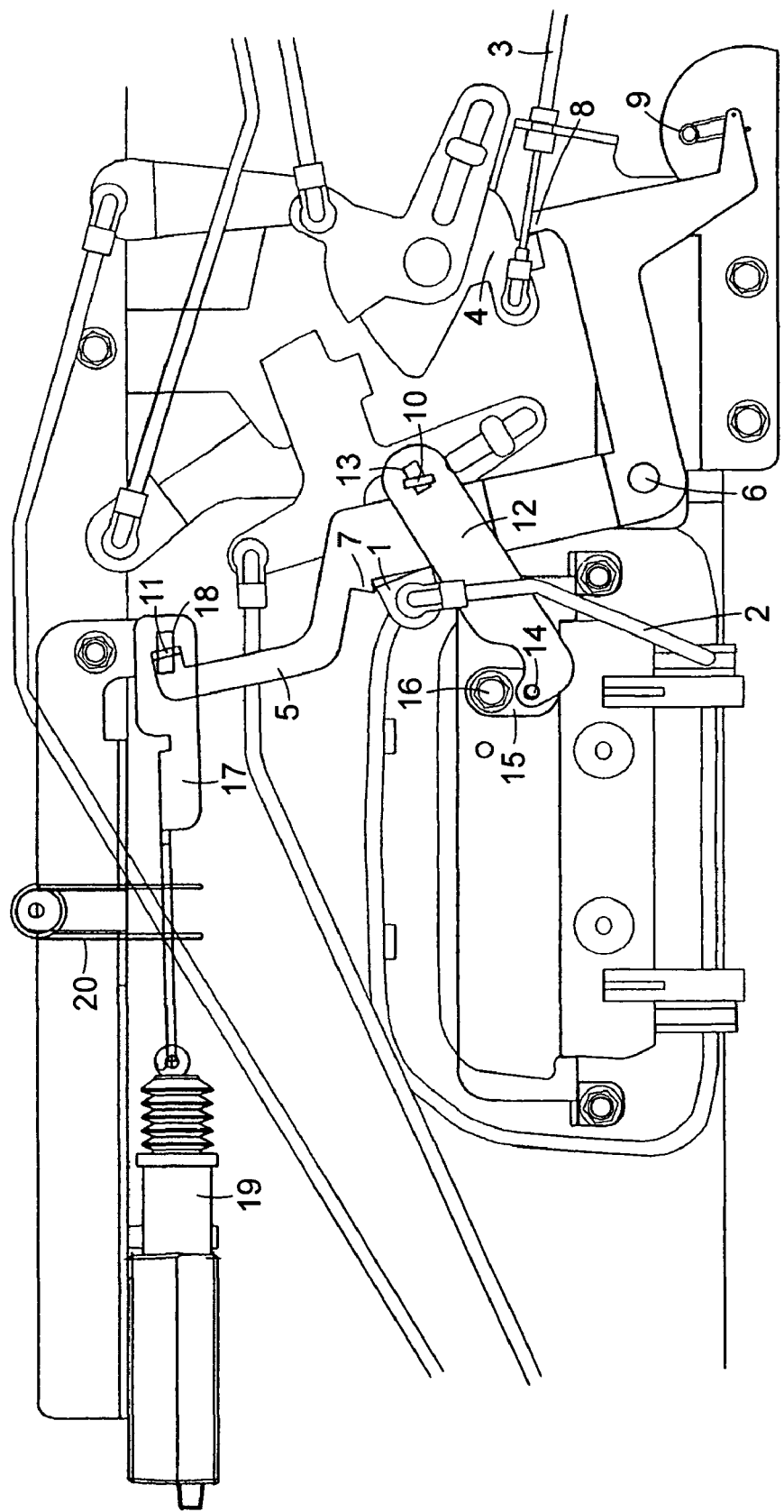
FIG. 7 shows an interior view of a tailgate latching mechanism and an interfering locking cam mechanism.

FIG. 7 shows a locking mechanism for a dual mode hinge tailgate such as described in U.S. Pat. No. 6,938,941. Such tailgates can be opened either side ways or up and down. Two separate handles are provided for each mode of operation. A synchronizing linkage mechanism assures that the tailgate cannot be opened both ways simultaneously.

The layout of my invention is shown in FIG. 7 in a plan view. The linkage 1 that opens the tailgate horizontally is actuated by a rod 2 that connects to the tailgate handle. The linkage 4 that opens the tailgate sideways is actuated by a cable pull that connects to a second handle (not shown). According to my invention a Bolt 5 is mounted so that it pivots on rivet 6. Bolt 5 has a tooth 7 and another tooth 8 which engage linkage 1 and linkage 4 respectively. When Bolt 5 is turned to the right it blocks linkages 1 and 4 from moving, thus locking the tailgate. A Spring 9 is arranged to provide an over center force that biases the Bolt 5 either to the right in the locked position, or when the Bolt 5 is turned a few degrees to the left, it biases the Bolt 5 to the unlocked position.

Bolt 5 carries two lugs 11 and 10. Lug 11 engages Actuator Bolt 17 with a slot 18 that provides some lost motion between the two. Electro mechanical Actuator 19 can pull the Actuator Bolt 17 to lock the Bolt 5, or can push it to unlock the Bolt 5, depending on the polarity of the applied voltage. Spring 20 returns the Actuator Bolt 17 to the neutral position when no voltage is applied to the Actuator 19.

Lug 1 engages Connecting Rod 12 with a slot 13 that also provides some lost motion between the two. The Crank 15 can pull the Connecting Rod 12 to also lock Bolt 5, or can push it to also unlock Bolt 5. Crank 15 attaches to the Lock Shaft (shown in detail in FIG. 8) and can be turned manually 45 degrees in both directions by the Key of the Lock.

Figure 8:
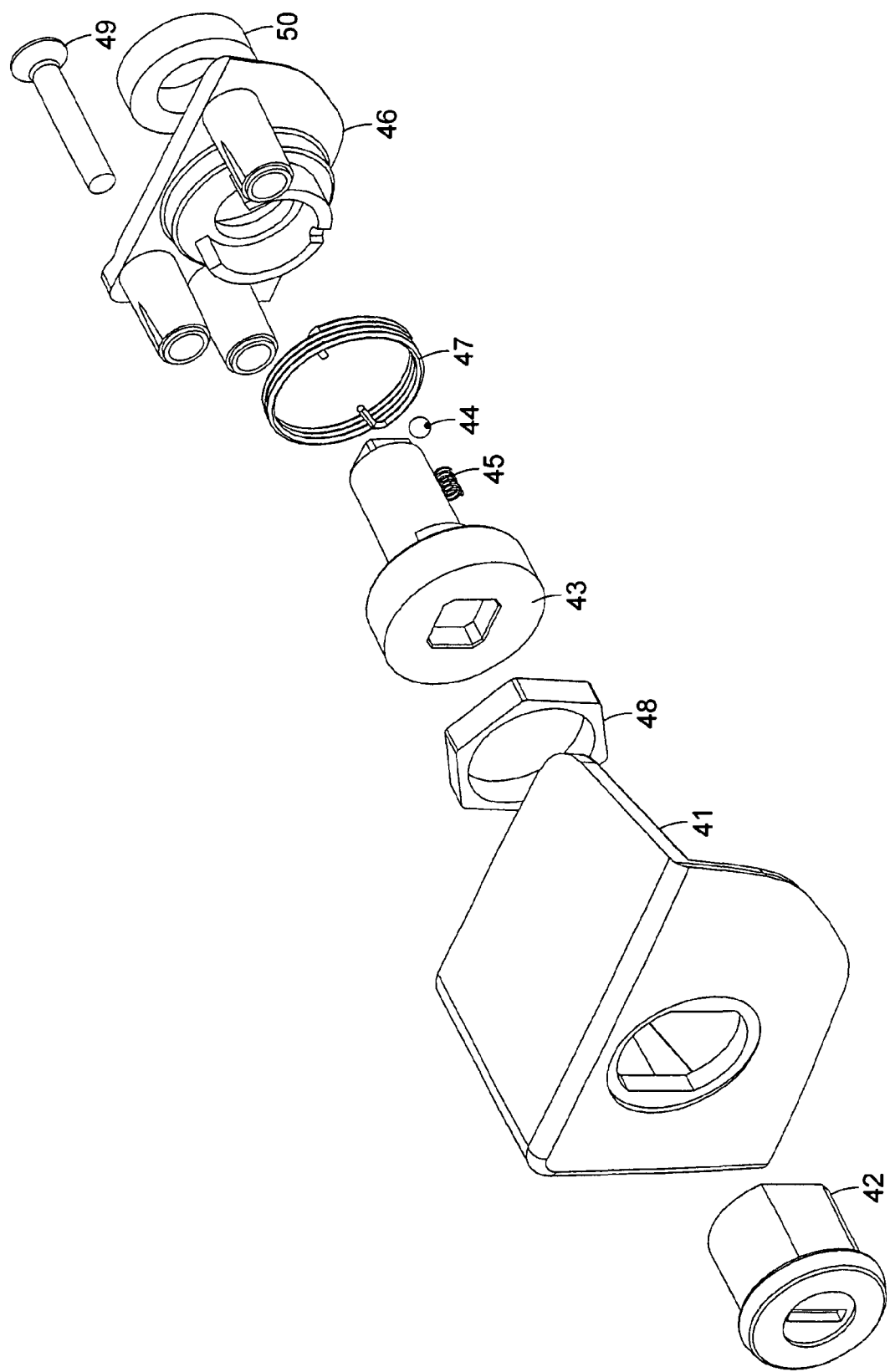
FIG. 8 shows an exploded view of a locking mechanism.

FIG. 8 shows the mechanism by which the Shaft 43 is spring loaded to return to the neutral position by the Spring 47 after the key is released. Additionally, Detent Spring 45 and Ball 44 bias the Shaft in the neutral position.

One feature of my invention is that the Tailgate can be locked and unlocked both electrically or manually by virtue of the lost motion afforded by the Slots 13 and 18 and the fact that both the Actuator and the Lock are spring loaded to return to the neutral position. Since both the Actuator Bolt 17 and the Connecting Rod 12 are spring loaded in the neutral position, either linkage can be actuated to lock or unlock the Bolt 5. The advantage of this feature is that since both modes function independently, the tailgate can be operated manually in the case of battery failure, or conversely, electrically if the key is misplaced.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for mounting a lock to a pick-up truck tailgate latching mechanism, comprising:
    locating one or more targets for one or more holes on an interior portion of a plastic bezel, the bezel carrying a handle actuating a tailgate latching mechanism;
    forming one or more holes in the plastic bezel from the interior portion to an exterior portion, the holes corresponding to the targets; and securing a locking mechanism at an exterior portion of the plastic bezel via at least one of the one or more holes formed in the plastic bezel.

2. The method of claim 1 wherein the step of locating one or more targets on an interior portion of a plastic bezel comprises forming at least one boss on the interior portion of the plastic bezel and forming a hole within each boss, the hole within each boss providing a target for a hole.

3. The method of claim 1 wherein the step of locating one or more targets on an interior portion of a plastic bezel comprises locating a template on the interior portion of the plastic bezel.

4. The method of claim 3 wherein the step of locating a template on the interior portion of the plastic bezel comprises placing exterior portions of the template shaped to match contours of the interior portion of the plastic bezel into alignment with the contours of the interior portion of the plastic bezel.

5. The method of claim 3 wherein the step of locating a template on an interior portion of the plastic bezel comprises:
   locating one or more holes in the template over pre-formed receptacles on the interior portion of the plastic bezel; and
   inserting fasteners through the one or more holes in the template and into the pre-formed holes on the interior portion of the plastic bezel.

6. The method of claim 5 wherein inserting fasteners through the one or more holes in the template comprises inserting one of: pins, dowels, bolts, rivets, or screws through the one or more holes.

7. The method of claim 1 wherein forming one or more holes in the plastic bezel from the interior portion to an exterior portion comprises drilling holes.

8. The method of claim 1 wherein securing the locking mechanism at an exterior portion of the plastic bezel via at least one of the one or more holes formed in the plastic bezel comprises coupling the locking mechanism to a fastener through the one or more holes.

9. The method of claim 8 wherein coupling the locking mechanism to a fastener through the one or more holes comprises one of:
   passing one or more bolts through the one or more holes and tightening the bolts into threaded portions of the locking mechanism;
   passing rivets through the one or more holes and coupling rivets to portions of the locking mechanism; and
   passing a threaded portion of the locking mechanism through the one or more holes and tightening nuts onto the threads extending to the interior portion of the plastic bezel.

10. The method of claim 3 wherein locating a template on an interior portion of a plastic bezel, the bezel carrying a handle for actuating a tailgate latching mechanism comprises securing the template to the interior portion of the plastic bezel; and
   wherein securing the locking mechanism on an exterior portion of the plastic bezel via at least one of the one or more holes drilled in the plastic bezel comprises coupling the locking mechanism to a fastener through the one or more holes in the template and in the plastic bezel.

11. The method of claim 10 wherein coupling the locking mechanism to a fastener through the one or more holes in the template and in the plastic bezel comprises one of:
   passing one or more bolts through the one or more holes in the template and in the plastic bezel and tightening the bolts into threaded portions of the locking mechanism;
   passing rivets through the one or more holes in the template and in the plastic bezel and coupling rivets to portions of the locking mechanism; and
   passing a threaded portion of the locking mechanism through the one or more holes in the template and in the plastic bezel and tightening nuts onto the threads extending to the interior portion of the plastic bezel.

12. The method of claim 1 wherein securing the locking mechanism on an exterior portion of the plastic bezel comprises securing the locking mechanism such that it is nested within a cavity at an exterior portion of the plastic bezel providing access to the handle.

13. A locking mechanism for a pick-up truck tailgate latching mechanism comprising:
   a lock cylinder, the cylinder including a shaft rotated by a key;
   a cam attached to the shaft of the lock cylinder, the cam moveable between a first position and a second position;
   a housing carrying the lock cylinder and cam, the housing mounted to an exterior portion of a plastic bezel of the pick-up truck, wherein, after the housing is positioned on the plastic bezel, at least a portion of the lock cylinder extends through a hole in the plastic bezel to an interior portion of the plastic bezel, the cam being completely located at the interior portion of the plastic bezel and positioned such that cam interferes with a tailgate latching mechanism in the first position and does not interfere with the tailgate latching mechanism in the second position, the bezel carrying a handle actuating a tailgate latching mechanism, and secured to the plastic bezel by coupling with at least one fastener located at an interior portion of the bezel via one or more holes in the plastic bezel; and
   a plate carrying one or more holes matching the one or more holes in the plastic bezel, wherein the at least one fastener couples to the locking mechanism via the one or more holes in the plastic bezel and the one or more holes in the plate.

14. The locking mechanism of claim 13 wherein the plate is comprised of metal.

* * * * *